May 6, 1958 A. S. FENSTER 2,833,558
FIFTH WHEEL HITCH
Filed Nov. 2, 1956
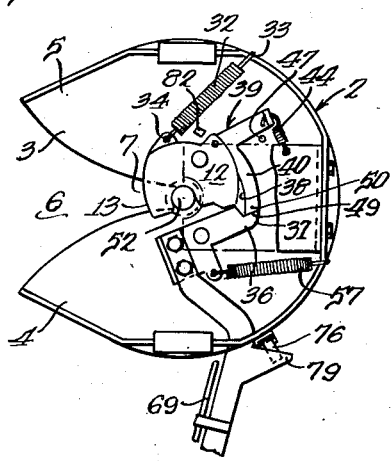
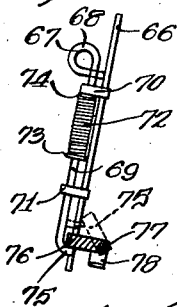
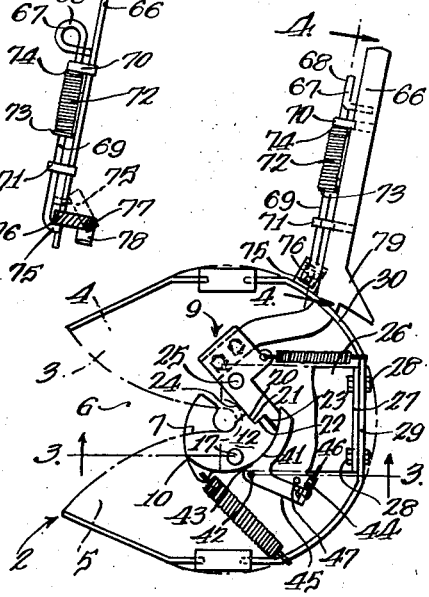
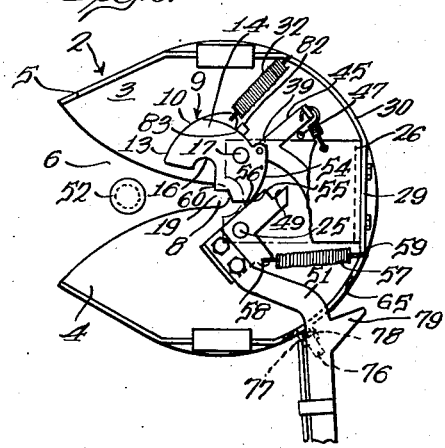
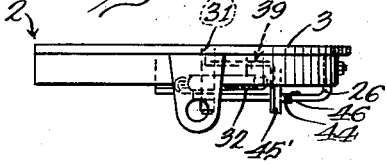
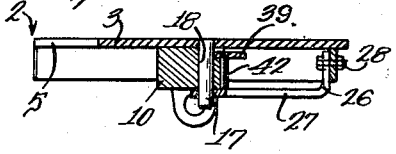
Inventor:
Abraham S. Fenster
By: Paul O. Pippel
Atty.

United States Patent Office 2,833,558
Patented May 6, 1958

2,833,558
FIFTH WHEEL HITCH

Abraham S. Fenster, Chicago, Ill., assignor to International Harvester Company, a corporation of New Jersey Application November 2, 1956, Serial No. 619,987

10 Claims. (Cl. 280—434)

This invention relates to couplers for tractor-trailer combinations and more specifically to a novel fifth wheel hitch.

The general object of the invention is to provide a novel, simple, and rugged fifth wheel hitch wherein the locking mechanism is of the automatic coupling type.

A more specific object of the invention is to provide a simple and efficient locking mechanism for a fifth wheel coupler which is adapted to be set in open position for automatic coupling with an associated coupling device or in unlocked position to accommodate uncoupling and wherein the mechanism automatically is thrown into open position when the parts are uncoupled.

A further object is to provide a novel means and arrangement for conditioning the mechanism in lock-set position preparatory to uncoupling.

A still further object of the invention is to provide a positive lock to the lock which absolutely insures that the mechanism cannot be accidentally uncoupled.

These and other objects of the invention will become more apparent from the specification and the drawings, wherein:

Figure 1 is a plan view of a fifth wheel coupler incorporating the invention, the bearing plate being shown in phantom lines in order to clarify the structure and the mechanism therebeneath, and the coupling pin being shown in cross-section;

Figure 2 is a side elevational view of the fifth wheel shown in Figure 1;

Figure 3 is a vertical sectional view taken substantially on the line 3—3 of Figure 1;

Figure 4 is a sectional view taken substantially on the line 4—4 of Figure 1; and Figures 5 and 6 are bottom views of the coupler with portions of the structure broken away, Figure 5 illustrating the mechanism in lock-set position preparatory to uncoupling and Figure 6 showing the mechanism in open or uncoupled position.

Describing the invention in detail and having particular reference to the drawings, there is shown a fifth wheel coupler generally designated 2 which comprises a bearing plate or body 3 upon which the bearing plate of the associated trailer, not shown, is adapted to rest and pivot. The plate 3 has rearwardly extending wings or points 4 and 5 which define a rearwardly diverging slot 6 which leads into a narrow throat 7 into which the associated king pin 52, is adapted to be guided to a central opening 8 (Figure 6) beneath which is mounted the coupling mechanism generally designated 9.

The coupling mechanism 9 comprises a U-shaped locking element, latch member, latch, coupling or locking jaw or dog 10 which includes front and rear legs 12 and 13 and a bight portion 14 which define a U-shaped pin-receiving slot 16 therebetween. The locking element 10 is pivotal on a vertical axis on a pin 17 which extends through an opening 18 in the forward leg 12 adjacent to its juncture with the bight portion 14, the axis of pivot 17 being disposed slightly forwardly and to one side of the opening 8 whereby the latch member 10 is accommodated swinging movement to a position disposing the rear leg 13 across the throat portion 7 in closing position to the open backside 19 of the center opening 8, as best seen in Figure 6. The free end of the leg 12 is provided with a notch 20 providing a stop surface 21 and a locking surface 22, the locking surface extending lengthwise of the leg 12 and abutting against a locking surface 23 on the free end of a latching bolt 24 which is swingable on a vertical axis on a pin 25 which is carried and connected to a support plate 27 which projects under the entire mechanism and which carries the beforementioned pin 17, the plate 27 having an upward flange 26 and being connected as by bolts 28 to an adjacent portion 29 of a peripheral flange 30 formed integral with and depending from about the margins of the carrier or top plate 3 of the fifth wheel. The pin 25 is disposed on the side of the king pin opening 8 opposite to that of pin 17 which is welded at its lower end to plate 27 and extends at its upper end through an opening 31 in the plate 3. The latching bolt 24 is swingable to and fro toward and away with respect to the latch 10. It will be seen that in the locked position of the locking bolt 24 and the coupling jaw 10 that the locking portion 23 is disposed between its pivot 25 and the jaw 10 whereby if the jaw 10 tends to rotate in an unlocking direction the bolt 24 is urged to swing in a direction toward the king pin opening whereby the mechanism is biased into locking position in opposition to the action of the tension spring 32 which at one end is hooked as at 33 to the flange 30 and at its other end is hooked as at 34 to an eye formed on the inner end of the leg 13 of the locking jaw and constantly urging the jaw to unlocking position.

The free end portion 36 of the latching bolt 24 is provided with an arcuate end surface 37 which is engaged in the locked position of the coupler by an arcuate surface 38 on the inner side of a bellcrank-shaped lock-set latching element generally indicated 39. The element 39 includes a leg 40 which is adapted in the closed position of the mechanism to lie against the outer curved edge 41 of the leg 12 with its side 38. The lock-set latch 39 is pivoted on a substantially vertical axis on a pin 42 at its elbow to a lug 43 which extends outwardly from the inner end of the leg 12. The lock-set element 39 is constantly urged or biased in a direction urging its leg 40 toward the leg 12 of the coupling jaw by means of a tension spring 44 which is connected at one end to a depending portion 45′ at the outer end of the forwardly projecting leg 45 of the bellcrank lock-set member 39, the spring being hooked at its other end as at 46 to the mounting plate structure 26. In the unlatched position of the mechanism as seen in Figure 6, the member 39 is rotated away from the locking mechanism by a stop member 47 which is in the form of a pin which is carried by the top plate 3 in abutting relation to the leg 45, as best seen in Figure 1.

It will be seen that the distal end portion 36 forms a lock-set projection on the locking bolt 24 which extends outwardly and overlaps the outer extremity of the leg 12 and provides a latching surface 49 against which seats the outer end 50 (Figure 5) of the leg 40 of the member 39 attendant to the handle 51 being rotated about the pivot 25 in an unlocking direction, that is counter-clockwise as seen in Figure 1, whereby the surfaces 20, 21 and 22, 23 are disengaged and the leg 36 is swung out of the path of rotation of the leg 12. It will be seen that upon such unlocking movement of the lever 51 that the edge 37 of part 24 slides along the edge 38 of the latch member 39 and passes the outer extremity 50 thereof whereupon the latch 39 snaps inwardly behind the lock-set lug 37 pursuant to the action of the tension spring 44. Thus the mechanism is conditioned for uncoupling whereby relative movement between the tractor and trailer will cause the pin 52 to withdraw rearwardly from the locking mechanism by swinging the member 10 in a clockwise direction (Figure 5) whereby the outer edge portion 54 on the leg 12 is caused to engage as at 55 the opposing edge 56 on the locking bolt, thus causing the handle to swing initially in a counterclockwise direction Figure 1 until edge 54 on the member 39 is swung away from the locking dog 10 by the member 39 pivoting about 47 until the member 39 snaps out from behind the big portion 37. The handle then swings clockwise as pulled by spring 57 hooked at one end at 58 to the handle and at the other end as at 59 to flange 30.

The handle 51 extends through a slot 65 in the flange 30 and terminates in an outer hand-grip portion 66 for grasping by the operator. Adjacent the hand-grip portion there is provided a finger hold 67 of a latch operating mechanism generally indicated 68 which includes a rod 69 which extends alongside the handle through a pair of eyes 70 and 71 extending from one side of the handle and spaced lengthwise thereof, there being provided a spring 72 sleeved over the rod and in compression between an abutment 73 carried by the rod intermediate the lugs 70 and 71 and engaging one end of the spring 72 and the other end of the spring being engaged as at 74 with the outer lug 70, the spring tending to urge the latch operating member inwardly. The inner end of the rod is provided with an upturned hook portion 75 which is disposed constantly behind the latch 76 which is pivoted at its upper end as at 77 from a hinge structure 78 connected to the adjacent portion of the flange 30. The latch 76, being pivoted at its upper end, will always swing across and in the path of movement of the handle 51 and prevent its actuation to unlocking position after the parts have been coupled, as shown in Figure 1. In order to release the latch 76 the operating mechanism 68 is pulled outwardly whereby swinging the latch above the plane of the handle, as shown in phantom lines in Figure 4, whereby the handle is accommodated passage therebeneath. The latch is prevented from dropping on the other side of the handle by means of an extension 79 on the handle over which and on which the latch rides, as best seen in Figure 5. When the handle is swung to locked position of the coupling mechanism the latch will drop behind the same and in front of the hook 75 inasmuch as the rod 69 is constantly being urged inwardly and after the initial unlatching the rod is allowed to move to its original position.

The dog 10 is limited in rotating to unlocking position by a dependent stop 82 on the plate 3 for abutment at 83 with member 10 as seen in Figure 6.

What is claimed is:

1. A fifth wheel comprising a body having an entrance slot for a king-pin terminating in a pin pocket, a U-shaped coupling member pivotally mounted at one side of the slot near said socket and having a rear leg adapted to swing across said slot behind the socket to retain a pin in the socket and having a front leg disposed in front of the socket, a locking bar pivotally mounted at the opposite side of the slot and having a swinging end engageable with the free end of said forward leg of the coupling member to lock it in pin retaining position, the pivot of said locking bar being in substantially direct alignment with the thrust of said coupling member thereagainst, a handle connected directly to said locking bar for swinging it into and out of locking position, said locking bar having a lockset portion projecting outwardly from said end and positioned in front of said front leg in the locked position of the coupling member, a bellcrank lockset latch element pivoted at its elbow to said front leg and having a laterally extending arm forwardly of the front leg and having an end portion overlapping the end of said lockset portion, said element having a forwardly projecting arm, a fulcrum on the body abuttable with said forwardly projecting arm, spring means connected between said forwardly projecting arm and said body for biasing said element in a direction engaging said lateral arm with said lockset portion of the locking bar, said lockset portion having a side edge adapted to catch behind the end of said lateral arm attendant to said coupling member being swung to release position with respect to said forward leg of the coupling member.

2. In a fifth wheel, a body having a king-pin entrance slot extending from one side thereof to the central portion of the body, said entrance slot having a closed forward end, a holding member U-shaped in plan pivotally mounted at its bight portion at the underside of the body at one side of the slot and a short distance outward from the closed end thereof, said holding member having front and rear legs swingable into said slot in front of the closed forward end thereof and behind the open end respectively in the open and closed positions of said holding member, a bellcrank trip lever disposed forwardly of the holding member and having an elbow pivoted to the holding member adjacent to the pivot thereof and having a lateral arm extending along said forward leg and having an end portion extending beyond the free end of said forward leg, said lever having a forwardly extending arm, a fulcrum depending from said body between said arms and in abutment with the adjacent side of the forwardly extending arm, spring means connected between said forwardly extending arm and said body for biasing said lever in a direction urging said forwardly extending arm against said fulcrum and said lateral arm toward said forward leg, a locking bar pivoted to said body at the opposite side of the slot and having a swinging end positionable in abutment with the free end of said forward leg in the coupling position of said holding member and swingable forwardly of said forward leg in the unlocking position, said locking bar having a latch portion projecting from said swinging end thereof and in coupling position disposed between said forward leg and said end portion of said lateral arm, said latch portion adapted to catch behind said end portion upon said locking bar being swung to uncoupling position for releasably holding the same in such position, and means for biasing said holding member and said bar in directions bringing said bar and forward leg into engaging position.

3. In a fifth wheel, a body having a king-pin entrance slot terminating in a closed end, holding means pivotally mounted on said body slightly rearwardly of the closed end of the slot at one side thereof for swinging movement on a vertical axis and comprising a U-shaped member having a bight and front and rear legs projecting therefrom toward said slot, spring means connected to the body and to said bight biasing said member in an uncoupling direction, a locking bar pivoted to said body at the opposite side of the slot and having a swinging end adapted to be moved into and out of locking engagement with said front leg of said holding member, spring means biasing said bar into locking engagement, a trip lever having forward and lateral arms connected at an elbow and pivoted at said elbow to said holding member, said lateral arm extending alongside said forward leg, a fulcrum on said body extending between said arms and in engagement with said forward arm for rotating said lever in a direction swinging said lateral arm away from said forward leg in response to said holding member swinging in an uncoupling direction, said locking bar having a catch adapted to enter between said forward leg and said lateral arm and to swing said lateral arm away from said leg attendant to said locking bar being swung in an unlocking direction and upon predetermined movement to catch behind the free end of said lateral arm whereby holding said bar in unlocked position to accommodate uncoupling movement of said holding member.

4. In a tractor-trailer coupling means, a fifth wheel member having a king pin socket, means for locking a king pin in said socket and comprising a locking jaw cooperating therewith and pivoted on said fifth wheel member, a locking bar pivoted on said member and swingable to locking and released positions with respect to said jaw, a trip latch pivotally carried on said jaw and cooperatively associated with said locking bar for holding it in lockset position for accommodating uncoupling movement of said jaw, and a fulcrum on said member for swinging said trip latch out of engagement with said locking bar in response to swinging movement of said jaw to uncoupled position.

5. The invention according to claim 4 and stop means on said member engageable with said jaw for limiting movement thereof in an uncoupling direction, and said jaw having a portion extending in its uncoupled position into said socket for engagement by a king pin to swing said jaw to coupling position.

6. The invention according to claim 4 and a handle connected to said locking bar and swingable therewith, and spring means operatively connected between said bar and said member for biasing said bar to its locking position.

7. In a tractor-trailer coupling means, a fifth wheel member having a king pin socket, a coupling element on the fifth wheel member for holding said pin in said socket, locking means engageable with said coupling element for locking the element in draft relation with the pin, means for disengaging the locking means to hold the same in retracted position comprising a latching lever pivotally supported on said element and engageable with said locking means, a fulcrum for the lever supported on said member for engagement by the lever to swing and disengage the lever from the locking means whereby tripping said disengaging means and releasing said locking means to move to its locking position, said element having a portion positioned in the uncoupled position of said element in front of said locking means and extending into said socket for preventing said locking means from moving into locking position and engageable by said pin for swinging said element into coupling position and coincidentally moving out of the path of movement of said locking means to accommodate its movement to locking position.

8. In a fifth wheel coupler, a fifth wheel having a king pin socket to receive a coupling pin, a coupling jaw member swingably mounted on said wheel and having first and second portions, locking means engageable with said second portion for locking the jaw with its first portion behind the socket in draft relation with the pin, manually operable means for disengaging said locking means and positioning it in retracted position, holding means carried by the jaw for releasably holding said locking means in said retracted position, means for tripping said holding means to release said locking means in response to said jaw swinging to uncoupled position and withdrawing said first portion from behind the socket and entering said second portion in front of said socket in which position it is disposed in obstructing relation to the movement of said locking means to locking position with said second portion, said second portion in said last-mentioned position disposed in the path of movement of the coupling pin so as to be moved thereby out of said socket and out of the path of movement of said locking means to locking position and swing said first portion behind the pin into locking engagement therewith.

9. The invention according to claim 8 and said holding means comprising a bellcrank lever having a first arm extending generally radially with respect to the pivot thereof and a second arm extending circumferentially with respect to said pivot and said lever pivoted to said jaw, and said tripping means including a fulcrum on the wheel for said radial arm disposed in the path of movement of the radial arm with said jaw in its uncoupling direction for swinging said lever to disengage said circumferential arm from said locking means, and means spring biasing said radial arm in said uncoupling direction.

10. The invention according to claim 8 and abutment means on said jaw and wheel for limiting movement of the jaw in uncoupling direction, and spring means between said member and jaw for biasing said jaw in uncoupling direction.

References Cited in the file of this patent

UNITED STATES PATENTS

| | | |
|---|---|---|
| 1,929,220 | Steinhauer | Oct. 3, 1933 |
| 1,981,233 | Harris | Nov. 20, 1934 |
| 2,075,781 | Lechtenberg | Mar. 30, 1937 |
| 2,426,002 | Den Besten | Aug. 19, 1947 |